United States Patent [19]

Moreira et al.

[11] Patent Number: 5,440,309
[45] Date of Patent: Aug. 8, 1995

[54] METHOD OF EXTRACTING MOTION ERRORS OF A CARRIER BEARING A COHERENT IMAGING RADAR SYSTEM FROM RADAR RAW DATA AND APPARATUS FOR CARRYING OUT THE METHOD

[75] Inventors: Joao Moreira, Landsberg; Bernd-Peter Noichl, Rosenheim, both of Germany

[73] Assignee: Deutsche Forschungsanstalt fur Luft- und Raumfahrt e.V., Köln, Germany

[21] Appl. No.: 223,721

[22] Filed: Apr. 6, 1994

[30] Foreign Application Priority Data

Apr. 8, 1993 [DE] Germany .................. 43 11 754.6

[51] Int. Cl.$^6$ .............................................. G01S 13/90
[52] U.S. Cl. ................................... 342/25; 342/195
[58] Field of Search .................... 342/25, 195, 165, 26, 342/159

[56] References Cited

U.S. PATENT DOCUMENTS

| | | | |
|---|---|---|---|
| 5,045,855 | 9/1991 | Moreira | 342/25 |
| 5,166,688 | 11/1992 | Moreira | 342/25 |
| 5,257,028 | 10/1993 | Keydel et al. | 342/25 |

Primary Examiner—Daniel T. Pihulic
Attorney, Agent, or Firm—Browdy and Neimark

[57] ABSTRACT

In a method of extracting motion errors of a carrier bearing a coherent imaging radar system from radar raw data, after calculating the entire azimuth spectrum (S(f,i)) and before correlation the azimuth spectrum is broken down over the entire bandwidth into n subspectra ($S_1(f,i)$ .... $S_n(f,i)$). Associated time-consecutive n subspectra of the two azimuth spectra are correlated with each other; by means of an expected frequency shift ($v_{er}$) a window width is defined. From the curve ($K_0(f,i)$) obtained by correlation of the azimuth spectrum and from the subcurves ($K_i(f,i)$ .... $K_n(f,i)$) obtained by subcorrelations the maximum curve value within the window is determined.

From the expected frequency shift ($v_{er}$) and a just calculated frequency shift (V(i)) the new frequency shift ($v'_{er}$) to be expected is determined. After simultaneous performing of the method steps described above over several strips of range gates ($N_s$), a frequency shift (V(i,m)) is calculated for each strip and a matrix is formed therefrom, from which all the values equal to zero are sought, whilst from adjacent positions of each zero position a new value is interpolated.

2 Claims, 10 Drawing Sheets

Spectrum A

Spectrum B v = 1 v = 2

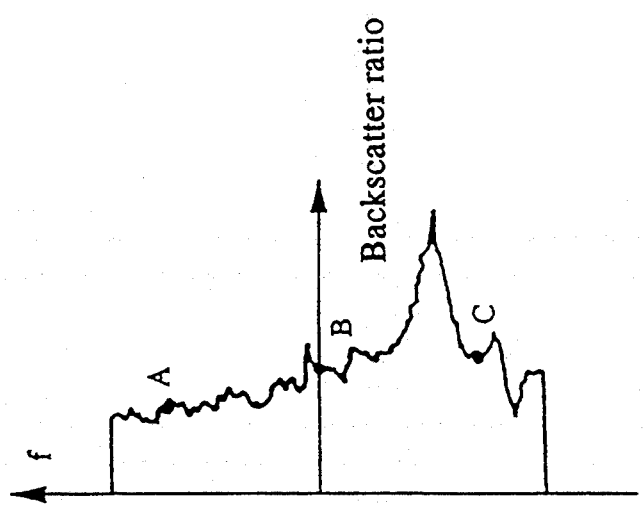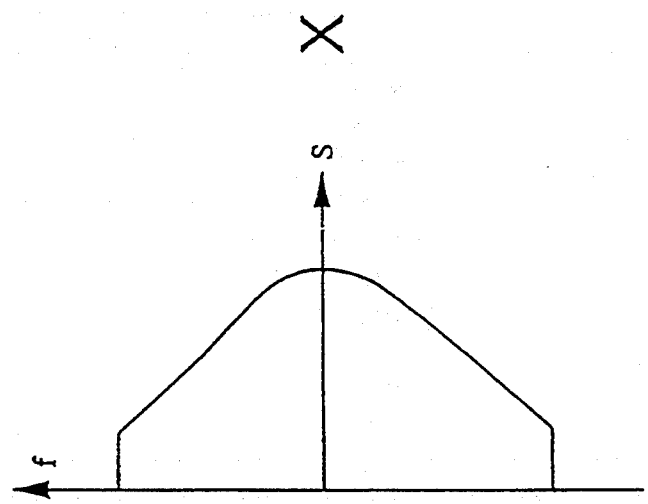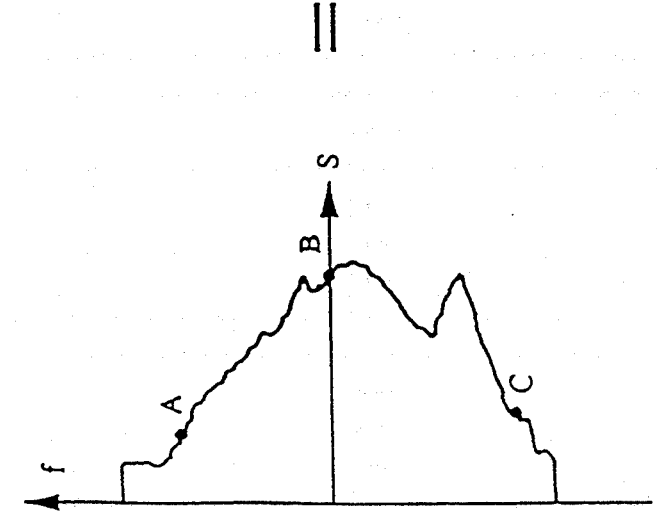

even numbered. page

METHOD OF EXTRACTING MOTION ERRORS OF A CARRIER BEARING A COHERENT IMAGING RADAR SYSTEM FROM RADAR RAW DATA AND APPARATUS FOR CARRYING OUT THE METHOD

BACKGROUND OF THE INVENTION

1. Field of the Invention

The invention relates to a method of extracting motion errors of a carrier bearing a coherent imaging radar system from radar raw data in which over a predetermined period of time consecutive azimuth spectra are continuously formed, for calculating a frequency shift over the entire azimuth spectrum $(S(f,i))$ a correlation $(K_O(f,i) = S(f,i) \otimes S(f,i-1))$ is carried out with $S(f,i)$ as azimuth spectrum at the instant i, with $S(f,i-1)$ as azimuth spectrum at the instant $(i-1)$ and with $\otimes$ as correlation), thereafter frequency shift values are processed and the displacement in line of sight direction of the antenna and the forward velocity are calculated. The invention also relates to an apparatus for carrying out this method comprising a means for calculating the azimuth spectrum $(S(f,i))$ for continuously forming consecutive azimuth spectra from radar raw data and a means for forming a correlation $(K_0(f,i))$ between respectively two azimuth spectra $(S(f,i); S(f,i-1))$ formed immediately consecutively in time.

2. Description of the Prior Art

Coherent imaging radar systems are installed in a carrier, for example an aircraft, a missile or a helicopter and the like. Normally, due to the conditions relating to such carriers and due to the influences of the environment, for example due to turbulences, a carrier cannot keep to a predetermined flight path. On the contrary, the carrier deviates from the desired reference flight path, and this is referred to as motion errors. With coherent imaging radar systems motion errors lying in the order of magnitude of the wavelength of the radar transmission signal cause distortions by which the quality of an image is very considerably impaired. The quality of an image is assessed by its resolution, contrast and the geometric distortions. In imaging, to obtain a high resolution, high contrast and low geometric distortions, the received raw data must be corrected before the processing or generating of the image. Such a correction can be carried out in real time or off-line. A real-time correction takes place during the reception of the backscatter signals with the aid of digital or analog actuators. An off-line correction is carried out on the ground with the aid of computing programs after storage of the raw data.

The processing or generation of an image cannot be carried out until after a correction, which is referred to as motion compensation. For generating an image a correlation is carried out between the raw data and the theoretical phase history to be expected and it is not until after such a correlation that a high-resolution two-dimensional image is obtained.

Here, the motion errors of the carrier must be determined very accurately to enable the raw data to be corrected. For this purpose, the following movements of the carrier must be determined, i.e. the forward velocity and the deviation in the viewing direction of the antenna.

All known real-time motion compensation systems are dependent on on-board inertial navigation systems (INS) and other navigation systems, such as GPS (Global Positioning System). All motion extraction methods are methods in which the motion errors of the carrier can be extracted from the radar raw data. For example, for this purpose the so-called autofocus method and also the so-called shift method known from DE 39 22 428 C2 may be used; with the shift method referred to above considerably better results can be achieved.

However, all the known motion compensation systems have various disadvantages. Due to the high demands made on the motion data as regards accuracy, bandwidth and time stability, for imaging radar systems in which a motion compensation is carried out inertial navigation systems made for example in special production must be used. This also however results in very high acquisition, installation and maintenance costs.

When using motion compensation systems operating with GPS receivers support by a ground station is indispensable. This however firstly makes the operating costs very high and secondly there are considerable restrictions in the choice of the use territory. However, without support by a ground station the GPS motion data absolutely essential to motion compensation are not accurate enough.

Although the autofocus methods are not dependent on inertial navigation systems, they nevertheless be carried out in real time because of the high computing expenditure. In addition, autofocus methods do not have a high bandwidth nor a high accuracy and consequently in particular the motion errors due to wind gusts cannot be corrected. For this reason, autofocus methods are thus normally only used for estimating the forward velocity of a carrier.

In motion compensation systems operating with the so-called shift method according to DE 39 22 438 C2, the shift between two azimuth spectra consecutive in time is evaluated. The shift here is determined by the position of the maximum of the correlation of the two azimuth spectra not however taking account of gaps in the correlation. Such gaps occur in the event of a pronounced time variation of the backscatter ratio component of the azimuth spectrum, for example on appearance of a pronounced point target in one of the azimuth spectra which are being correlated.

SUMMARY OF THE INVENTION

The object of the invention is therefore to obtain with a method of extracting motion errors of a carrier bearing a coherent imaging radar system from radar raw data and with an apparatus for carrying out this method a considerable improvement in the image quality of images even compared with the shift method known from DE 39 22 428 C2 without having to have recourse to a navigation system, for example INS.

The invention therefore proposes a method of extracting motion errors of a carrier bearing a coherent imaging radar system from radar raw data in which over a predetermined period of time consecutive azimuth spectra are continuously formed, for calculating a frequency shift over the entire azimuth spectrum $(S(f,i))$ a correlation $(K_O(f,i) = S(f,i) \otimes S(f,i-1))$ is carried out with $S(f,i)$ as azimuth spectrum at the instant i, with $S(f,i-1)$ as azimuth spectrum at the instant $(i-1)$ and with $\otimes$ as correlation), thereafter frequency shift values are processed and the deviation in the viewing direction of the antenna and the forward velocity are calculated, wherein after the computation of the entire azimuth spectrum ($S(f,i)$) and before the correlation ($K_O(f,i)$) the azimuth spectrum $S(f,i)$ is broken down over the entire bandwidth, consisting of B points, into n subspectra ($S_1(f,i)$ .... $S_n(f,i)$), the initial frequency corresponding to $(j-1) \cdot B/n$ of the jth subspectrum and the end frequency thereof corresponding to $(j(B/n) - 1)$ where $j = 1 \ldots n$);

the respective associated consecutive n subspectra of the two azimuth spectra are correlated with each other, i.e. $K_j(f,i) = S_j(f,i) \otimes S_j(f,i-1)$;

with the aid of an expected frequency shift ($v_{er}$) a window ($W(i) = v_{er} \pm \delta$ with $\delta$ as half-window width) is determined;

from the curve ($K_O(f,i)$) obtained by the correlation of the entire azimuth spectrum and the subcurves ($K_1(f,i) \ldots K_n(f,i)$) obtained by the subcorrelations within the window the maximum value of the curve is determined, the subshift is the position of the maximum value, the subshift is not taken into account if the maximum lies on the window boundary, and valid subshifts are subsequently sorted in ascending order and, 1. only subshifts which are not equal to zero are used,
2. a frequency shift ($v(i)$) from the mean value of up to three centrally disposed subshifts is calculated, and
3. an error marking in which a frequency shift is set to zero is transferred for the case where all the values are equal to zero or no subshift is present;

from the expected frequency shift ($v_{er}$) and the just computed frequency shift ($v(i)$) the new frequency shift ($v'_{er}$) is determined in accordance with the relationship ($v'_{er} = v_{er} \cdot C_1 + V(i) \cdot C_2$ with $C_1$ and $C_2$ as constants);

the method steps described above are carried out simultaneously and independently over several strips of range gates ($N_s$);

a frequency shift ($V(i,m)$, i denoting the time and m the range) is calculated for each strip and a matrix is formed therefrom; from said matrix all the values are sought which are equal to zero and from adjacent positions of each zero position a new value is interpolated, and the corrected matrix is further processed for processing the frequency shift values and finally the deviation in the viewing direction of the antenna and the forward velocity are calculated.

The invention also relates to an apparatus for carrying out the method comprising a means for calculating the azimuth spectrum ($S(f,i)$) for continuously forming consecutive azimuth spectra from radar raw data and a means for forming a correlation ($K_O(f,i)$) between respectively two azimuth spectra ($S(f,i); S(f,i-1)$) formed immediately consecutively in time, comprising a means for forming n subspectra over the entire bandwidth (B) from the spectrum calculated by said means;

registers for storing the n subspectra ($S_j(f,i)$ with $j = 1, \ldots n$);

means for correlation formation between every two immediately adjacently formed subspectra;

means for determining the position of the maximum within a window ($W(i)$);

means for sorting and marking the values obtained by the position determining means;

a means for determining a new window ($W(i+1)$);

a means for seeking and correcting the errors from the values obtained by the sorting and marking means, and a means for processing the frequency shift values and for calculating the deviation in the viewing direction of the antenna and the forward velocity.

It is again a requirement for carrying out the method according to the invention that the motion data of a carrier bearing the imaging radar system are determined as accurately as possible so that the raw data obtained thereby can be correspondingly corrected. For this purpose, the forward velocity of the carrier, the deviation, i.e. the deviation in the viewing direction of the antenna, and the drift angle of the carrier are determined. For this purpose, in the method according to the invention a new algorithm is used for calculating the frequency shift between two azimuth spectra, thereby even further improving the shift method according to DE 39 22 428 C2 as regard accuracy and reliability. The method according to the invention is therefore particularly suitable for array processes and parallel computer systems, but can also be implemented in conventional computer systems. In the method according to the invention the azimuth spectrum is additionally subdivided. This makes it possible to calculate still more accurately the frequency shift of each spectrum component with the aid of an expected frequency shift and a so-called window method. By sorting reliable frequency shift values and forming a mean value from such shift values, should the calculated frequency shift not lie in the range of the expected frequency shift this can be recognised as an error and corrected.

Compared with inertial navigation systems the method according to the invention has the advantage that the motion extraction method according to the invention can be implemented more economically because the computing power necessary for it can easily be achieved with modern computer systems both in real time and off-line.

An advantage compared with the GPS systems mentioned at the beginning is that with the motion extraction method according to the invention for motion compensation all the necessary information is extracted from the radar raw data. As a result no ground station is required, i.e. the method according to the invention is considerably more flexible and thus also more independent than the GPS system.

Compared with the autofocus methods the motion extraction method according to the invention has a still far higher bandwidth. In addition, many motion errors, such as the acceleration, velocity and deviation, i.e. the deviation in the viewing direction of the antenna, can be additionally determined; these are all data which cannot be obtained with autofocus methods. Nor can autofocus methods be implemented in real time.

Advantageous compared with the so-called shift method according to DE 39 22 428 C2 is that less computing expenditure is necessary because there is no need to process all the raw data to obtain the same accuracy. Furthermore, a frequency shift error is rapidly recognised and corrected. In addition, the motion extraction method according to the invention is far less sensitive to interferences than the known shift method even with low contrast of the imaged area.

BRIEF DESCRIPTION OF THE DRAWINGS

The invention will be described in more detail hereinafter with reference to preferred embodiments with the aid of the attached drawings, wherein:

FIGS. 8a to 8c are schematic illustrations of diagrams which in their combination form an azimuth spectrum, FIG. 8a illustrating schematically an azimuth spectrum of a range gate, FIG. 8b illustrating the schematic profile of a spectrum of an antenna diagram and FIG. 8c illustrating the schematic profile of a spectrum of a backscatter ratio.

DESCRIPTION OF THE PREFERRED EMBODIMENTS

Figure 7B:
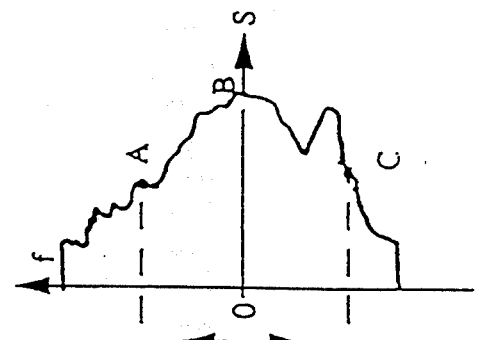
FIG. 7b shows an azimuth spectrum of a range gate in the form of a diagram.
Figure 7A:
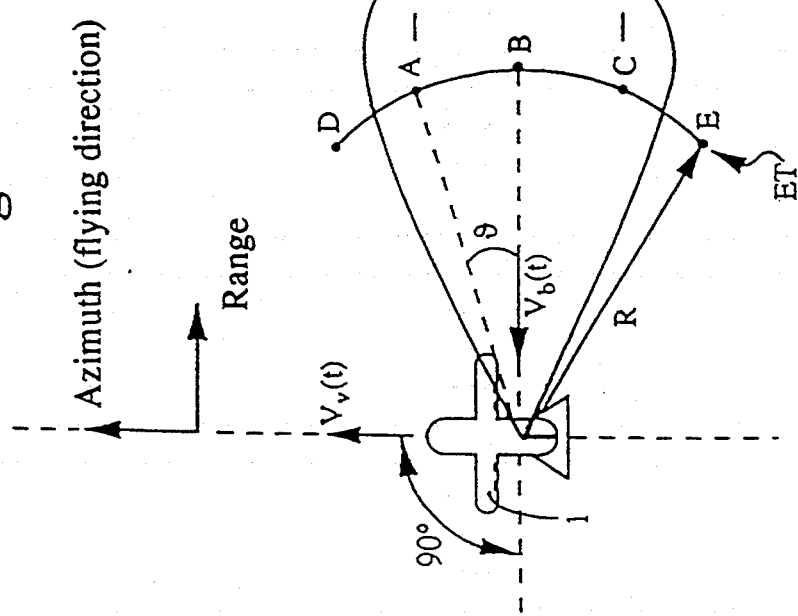
FIG. 7a shows schematically a general representation of radar geometry.

In FIG. 7a an example is shown of conventional radar geometry and the corresponding azimuth spectrum. A carrier of a radar system in the form of a schematically indicated aircraft 1 is assumed to fly with a velocity $V_v$ and thereby have a velocity error $V_b$ in the line of sight direction of an antenna not shown in detail, the main direction of which is schematically indicated. The two velocity quantities $V_v$ and $V_b$ are dependent on the time t and are therefore indicated in the drawings and hereinafter as $V_v(t)$ and $V_b(t)$ respectively. With the radar antenna mounted on the aircraft 1 a terrain to be imaged can be illuminated with the antenna main lobe which is aligned in the flight direction. As targets to be detected, for example target points A, B, C, D and E are given in a certain range gate ET. In FIG. 7a only the point targets A, B and C are illuminated.

Due to the flying velocity $V_v(t)$ and the velocity $V_b(t)$ in the line of sight direction each backscatter signal undergoes a frequency and Doppler shift according to the following equation (1):

$$F_{doppler} = \frac{2 \cdot V_v(t) \cdot \sin\theta}{\lambda} + \frac{2 \cdot V_b(t) \cdot \cos\theta}{\lambda} \quad (1)$$

where $\theta$ is the angle between the radar line of sight to the respective target point and the line perpendicular to the flight path and $\lambda$ is the wavelength of the emitted radar pulse. For the point target A with an $\theta > 0$ with the flight velocity $V_v(t)$ a positive frequency shift is generated whilst for the point target C with an angle $\theta < 0$ with a flight velocity $V_v(t)$ a negative frequency shift is generated. For the point target B ($\theta = 0$) the velocity $V_v(t)$ does not result in any frequency shift.

FIG. 7b illustrates schematically an azimuth spectrum of the range ET, the frequency f being plotted along the vertical axis and the power S regarding the three-point targets A, B and C plotted along the horizontal axis. Furthermore, on the left next to the vertical axis it is indicated that in the positive direction the frequency f is greater than 0 and in the negative direction is smaller than 0.

In FIGS. 8a to 8c in schematic curves the composition of an azimuth spectrum is given; in the individual illustrations in each case the frequency f is plotted on the vertical axis and the power S along the horizontal axis. As apparent in particular from FIGS. 8b and 8c, the azimuth spectrum of a range gate ET shown schematically in FIG. 8a is made up essentially of the product of the antenna diagram illustrated in FIG. 8b in the azimuth direction and of the backscatter ratio defined by the respective target points, for example A, B and C, and illustrated in FIG. 8c, backscatter ratio meaning the ratio between the power of the received and the transmitted signal.

The antenna diagram component of an azimuth spectrum illustrated in FIG. 8b is shifted in frequency according to the equation (2) by a drift angle and by the velocity in the antenna viewing direction, the following equation applying to a frequency shift $f_a$:

$$f_a = \frac{2 \cdot V_v(t) \cdot \sin\phi(t)}{\lambda} + \frac{2 \cdot V_b(t)}{\lambda} \quad (2)$$

where $\phi(t)$ is the drift angle of the carrier.

The component of the backscatter signal ratio of the azimuth spectrum is shifted in frequency by the velocities in the antenna viewing direction in accordance with the following equation (3). This frequency shift $f_r$ is then represented by:

$$f_r = \frac{2 \cdot V_b(t)}{\lambda} \quad (3)$$

In the shift method known from DE 39 22 428 C2 the two components of the azimuth spectrum shown schematically in FIGS. 8b and 8c, i.e. the antenna diagram component and the backscatter ratio component, are evaluated individually and separately from each other.

Figure 9:
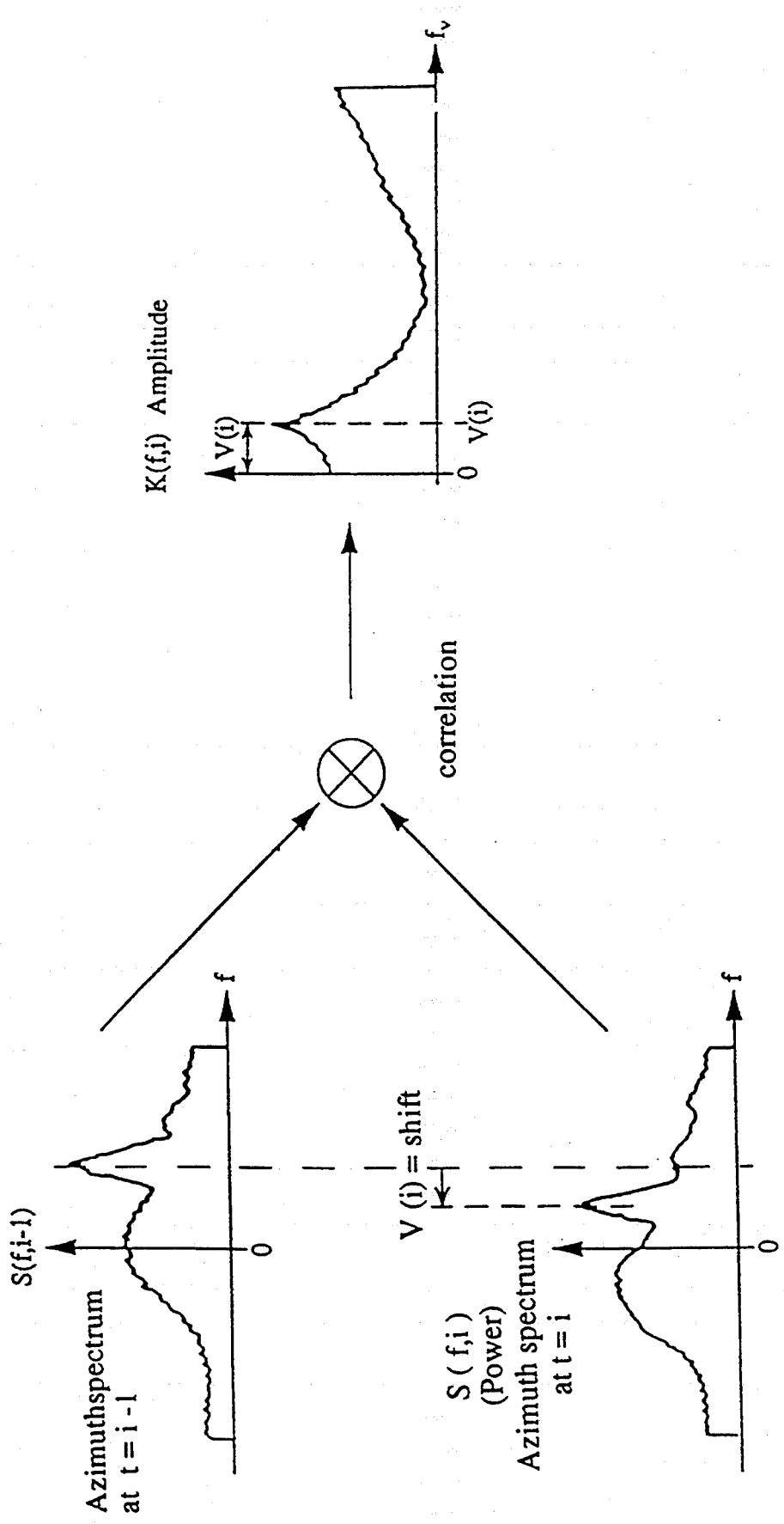
FIG. 9 shows the schematic variation of an azimuth spectrum at two different instants (t=i−1 and t=i) and the correlation thereof for determining a frequency shift according to the motion extraction method of DE 39 22 428 C2.

In FIG. 9 two such azimuth spectra are shown, in the upper part for the time t=i−1 and in the lower part for the time t=i, i being a whole number greater than 1. In the two azimuth spectra on the vertical axis the power S is plotted as a function of the frequency f plotted along the horizontal axis. Furthermore, in the lower diagram a shift V(i) of a maximum with respect to the azimuth spectrum in the upper part of FIG. 9 is shown.

The profile of a backscatter ratio always has a negative frequency shift because a carrier (1) bearing the radar system always flys in the forward direction and thus all scatterers, i.e. all objects which are illuminated by the radar and scatter the illumination back, undergo a negative Doppler shift.

Consequently, two consecutively acquired spectra are very similar and after a corresponding development a frequency displacement derived from the above equations 1 and 3 is obtained with a frequency shift V (in Hz):

$$V = \frac{2 \cdot V_v^2(t) \cdot \Delta(t)}{\lambda \cdot R} + \frac{2 \cdot V_b(t) \cdot \Delta T}{\lambda} \quad (4)$$

wherein R is the range of the range gate from the antenna mounted on the carrier and Δt the time interval between the consecutively acquired spectra. As shown in the lower part of FIG. 9, the shift can be determined by the position of a maximum with the aid of a correlation of the two spectra, as indicated schematically in the right part of FIG. 9, this then giving with regard to the example illustrated the curve path shown on the right in FIG. 9. Here, the amplitude is plotted along the vertical axis as a function of the shift $f_v$ plotted on the horizontal axis and the quantity i.

Figure 1:
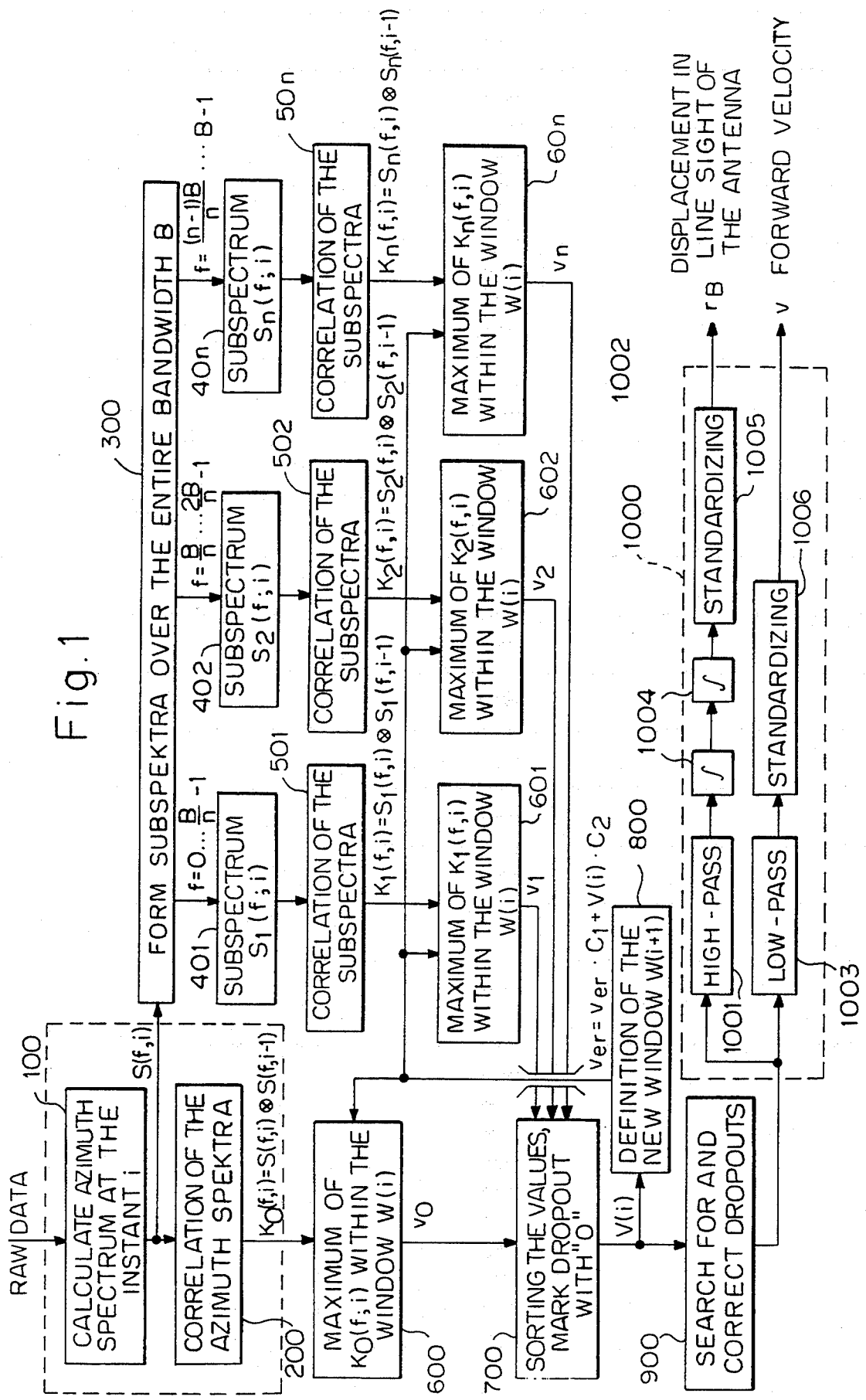
FIG. 1 shows an apparatus for carrying out the method according to the invention in the form of a block diagram.

The algorithm with which a frequency shift of two consecutive azimuth spectra is calculated with the method according to the invention is illustrated schematically in a block diagram in FIG. 1. The calculation conducted here is as follows: after selecting a strip of $N_s$ range gates, from these $N_s$ range gates $N_s$ azimuth spectra are calculated with the aid of a fast Fourier transformation (FFT). From the mean value of $N_s$ azimuth power spectra of the respective $N_s$ range gates an averaged azimuth power spectrum is formed. This averaged azimuth power spectrum is then denoted azimuth spectrum $S(f,i)$.

A block diagram of an apparatus for carrying out the method of extracting motion errors of a carrier bearing an imaging radar system from radar raw data is shown in detail in FIG. 1. For imaging a terrain the latter is illuminated with the main lobe of an antenna mounted on the aircraft 1 (see FIG. 7a). As a result, over a certain period of time with a means 100 for detecting azimuth spectra such spectra are continuously acquired consecutively in time, i.e. at different instants i (i being a whole number greater than 1). The period for acquiring the data is far shorter than the time which the aircraft 1 takes to fly over the terrain to be imaged. Two such azimuth spectra are illustrated schematically for the instants $t=i-1$ and $t=i$ as an example in the left part of FIG. 9. The azimuth spectra acquired consecutively in dependence upon the radar frequency f with a power $S(f,i)$ are formed in a means 200 for forming correlations between immediately consecutively acquired azimuth spectra, i.e. $K(f,i)=S(f,i) \otimes S(f,i-1)$. The frequency shift thus obtained and denoted in FIG. 9 as frequency shift $V_{(i)}$ is referred to hereinafter as subshift $v_0(i)$. In accordance with the method of the invention, the azimuth spectra $S(f,i)$ at the output of the means 100 is broken down in a further means 300 into n subspectra $s_1(f,i) \ldots S_n(f,i)$ over the entire bandwidth, which consists of B points. The frequency f can be broken down into the following subfrequencies:

$$f_{S1}=0 \ldots (B/n)-1; f_{S2}=B/n \ldots (2B/n)-1;$$
$$f_{Sn}=(n-1)B/n \ldots B-1$$

Figure 2A:
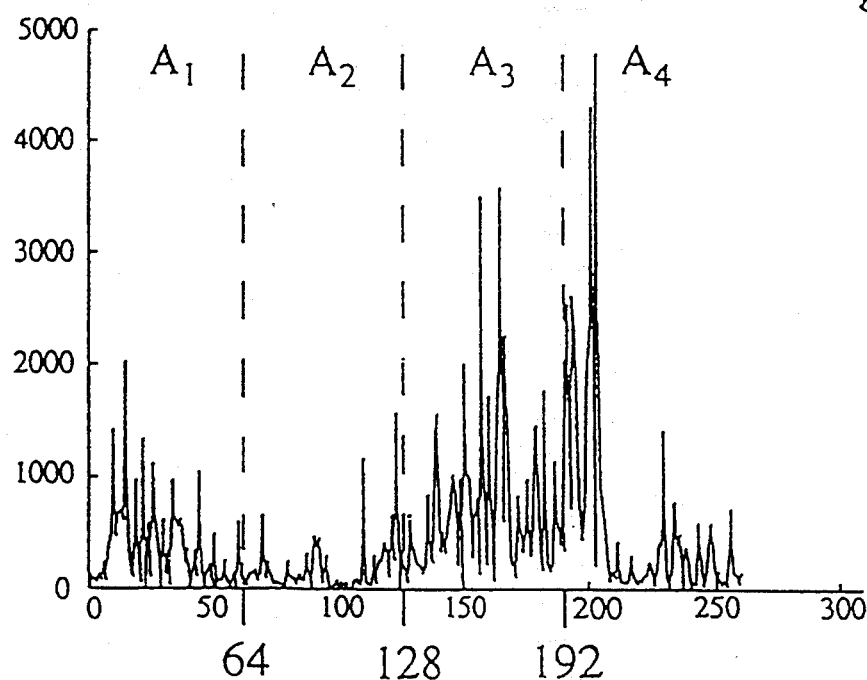
FIG. 2a shows an azimuth spectrum A and several subspectra $A_1$ to $A_4$.
Figure 2B:
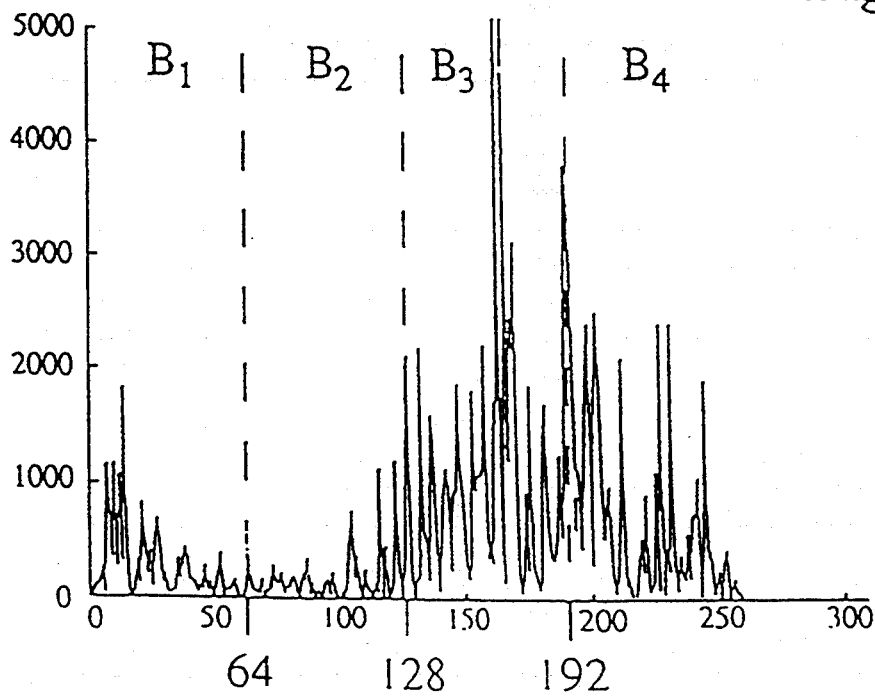
FIG. 2b shows a further azimuth spectrum B and a number of subspectra $B_1$ to $B_4$.

The n subspectra $S_1(f,i) \ldots S_n(f,i)$ formed are stored in parallel-connected registers 401, 402, ... 40n following the subspectra-forming means 300. The n subspectra $S_j(f,i)$, j being a whole number between 0 and n, stored in the registers 401 to 40n are supplied to means 501, 502, ... 50n which follow the registers 401 to 40n and in which a correlation is formed between every two immediately consecutive subspectra so that for example at the output of the means 501 there is:

$$K_1(f,i)=S_1(f,i) \otimes S_1(f,i-1)$$

whereas for example the following is present as correlation result at the means 50n: $K_n(f,i)=S_n(f,i) \otimes S_n(f,i-1)$. The subspectra are individually correlated in order to eliminate disturbing influences of surfaces or targets having a reflectivity highly dependent on the time and viewing angle. As examples of this, in FIGS. 2a and 2b two spectra A and B are shown which are each divided into four subspectra $A_1$ to $A_4$ and $B_1$ to $B_4$ respectively. The spectra A and B are each correlated by the shift method described in DE 39 22 428 C2 analogously to the illustration in FIG. 9 and the above explanations of FIG. 9 in that a correlation is formed between associated subspectra $A_1 \otimes B_1 \ldots A_4 \otimes B_4$, in the form $$K_j(f,i)=S_j(f,i) \otimes S_j(f,i-1) \text{ mit } j=0 \ldots n$$

Thus, by the correlation the curves $K_j(f,i)$ are obtained from which the frequency shift can then be determined.

Figure 3A:
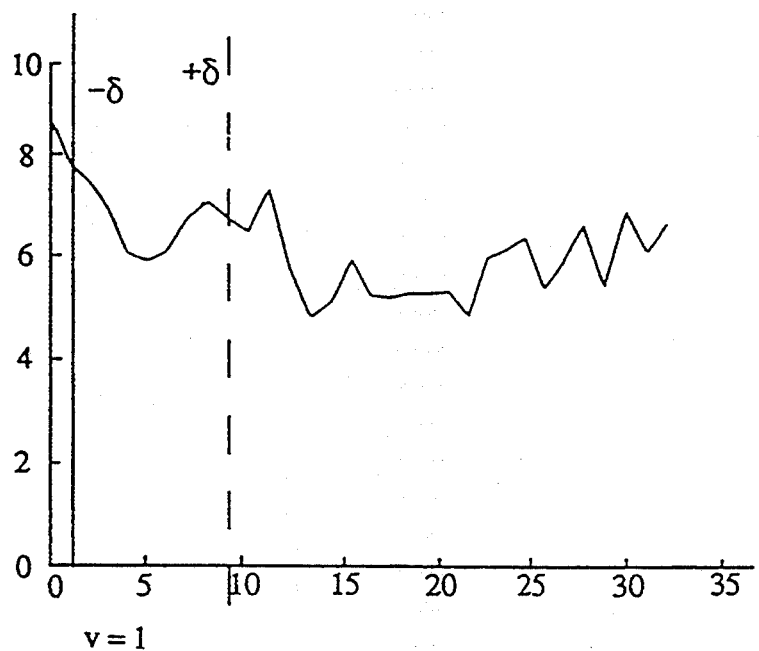
FIGS. 3a to 3e are schematic illustrations of the results of correlations of subspectra.
Figure 3B:
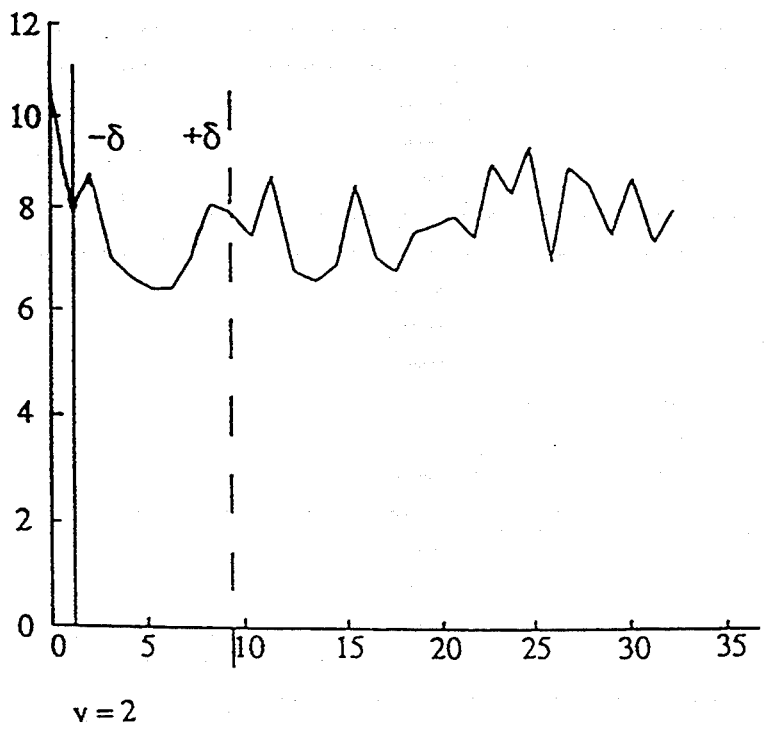

With the aid of an expected frequency shift $v_{er}$ a window $W(i)=v_{er}\pm\delta$, δ denoting the half-window width. The frequency shift to be determined must lie within such a window as indicated schematically in general form in FIG. 4. The corresponding results for the individual correlations of the subspectra $A_1$ to $A_4$ and $B_2$ to $B_4$ are illustrated in FIGS. 3a to 3e. In the individual Figures the frequency shift is entered as a full vertical line and the right or left window borders by vertical dash lines. In FIG. 3a, in which the correlation $A \otimes B$ of the two spectra A and B is illustrated, the frequency shift lies at the left window border and for this reason the dash vertical line to be entered falls on the full line in FIG. 3a; consequently, the frequency shift is not valid. In FIG. 3b, in which the correlation $A_1 \otimes B_1$ is formed from the two subspectra $A_1$ and $B_2$, the frequency shift $v_1=2$ because it lies clearly within the borders denoted by the dash vertical lines; the frequency shift $v_1=2$ is thus valid.

Figure 3C:
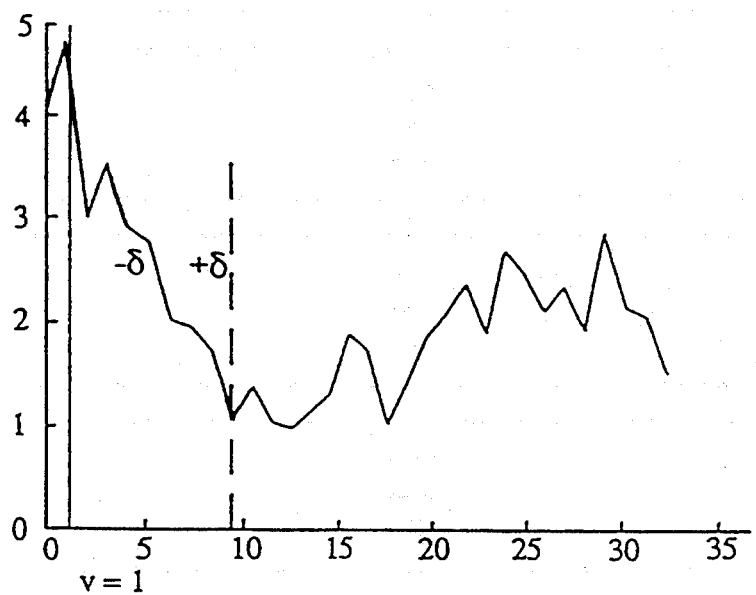
Figure 3D:
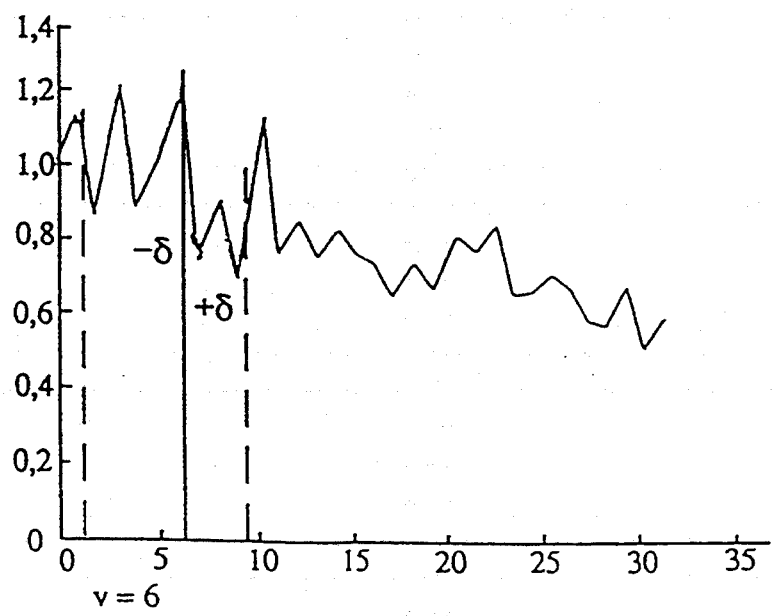
Figure 3E:
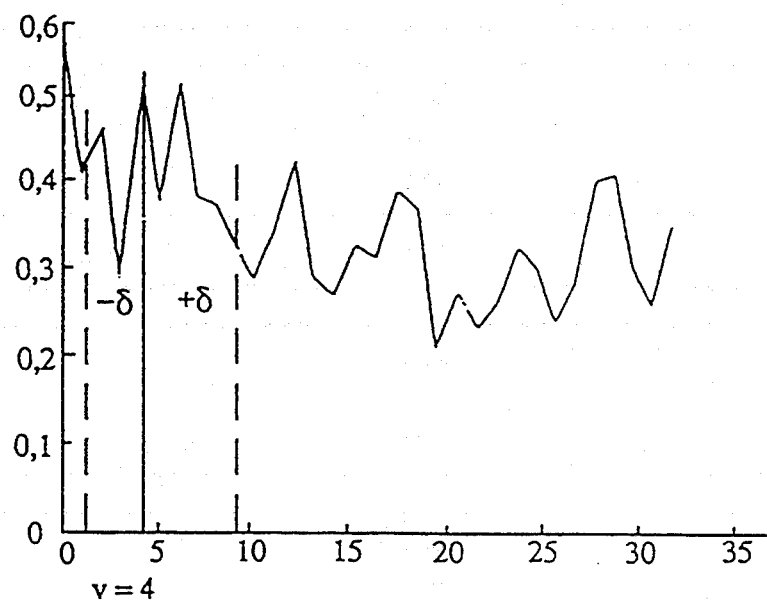
Figure 4:
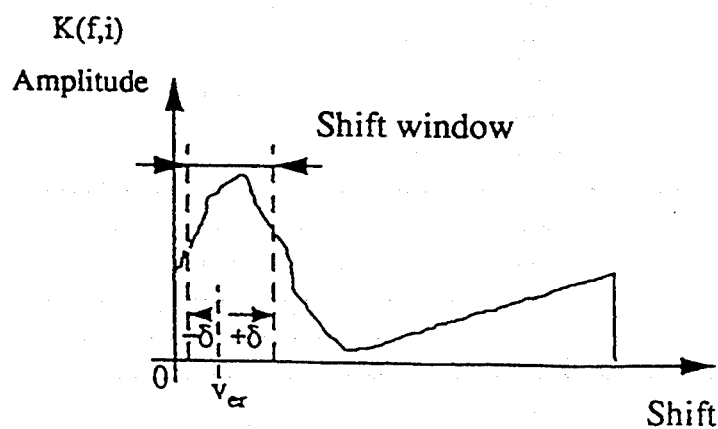
FIG. 4 is a schematic illustration of an application of a so-called shift window to a shift determination.

In FIG. 3c the correlation $A_2 \otimes B_2$ is formed from the subspectra $A_2$ and $B_2$, and once again the frequency shift lies on the left border and is therefore not valid. On the other hand, in FIG. 3d, in which the correlation $A_3 \otimes B_3$ is formed from the corresponding subspectra $A_3$ and $B_3$, the frequency shift v is clearly within the borders indicated again by dash vertical lines and is thus valid in the form of the frequency shift $v_3=6$. In FIG. 3e as well, in which the correlation $A_4 \otimes B_4$ of the two subspectra $A_4$ and $B_4$ is illustrated, the frequency shift $v_4=4$ is again clearly within the borders likewise indicated by dash vertical lines and is thus valid.

Within the window the maximum value of the curve is determined in each case from the curve $k_0(f,i)$ obtained by the correlation of the entire azimuth spectrum at the output of the means 200 and from the subcurves $K_1(f,i), K_2(f,i) \ldots K_n(f,i)$ obtained by the subcorrelations in the corresponding means 501, 502, 50n, and consequently at the output of the means 600 to 60n the corresponding subfrequency shifts $v_0$ to $v_n$ are present as position of the respective maximum value. If the corresponding maximum lies at the window border it will be considered as error and the corresponding subshift will not be taken into account or will be regarded invalid, as shown with reference to the examples in FIGS. 3a and 3c.

For the curves $K_0(f,i)$ to $K_n(f,i)$ at the most $(n+1)$ subshifts $v_0(i)$ to $v_n(i)$ are obtained. The subshifts which are valid and thus to be taken into account are subsequently sorted in ascending order in a means 700 and evaluated and thus simultaneously marked in the following manner:

(a) Only values which are not equal to 0 are used because in practice two identical spectra cannot follow each other in time.
(b) If the number of values which are not 0 occurring is even, to form the average the two centrally disposed subshifts are used and correspondingly with an odd number of subshifts three centrally disposed subshifts are used.
(c) If only one valid subshift is present it is adopted directly.
(d) For the case in which all values are equal to 0, or no subshift is present, 0 is transferred as error marking.

The value present at the output of the sorting and marking means 700 and resulting from the evaluation made is then the new frequency shift $V(i)$.

The new frequency shift $v'_{er}$ to be expected from the expected frequency shift $v_{er}$ and the frequency shift $V(i)$ just calculated is then determined in the following manner:

$$v'_{er} = v_{er} \cdot C_1 + V(i) \cdot C_2,$$

where $C_1$ and $C_2$ are system-specific constants. The new frequency shift $v'_{er}$ is calculated here should $V(i)$ not be equal to zero.

Figure 5:
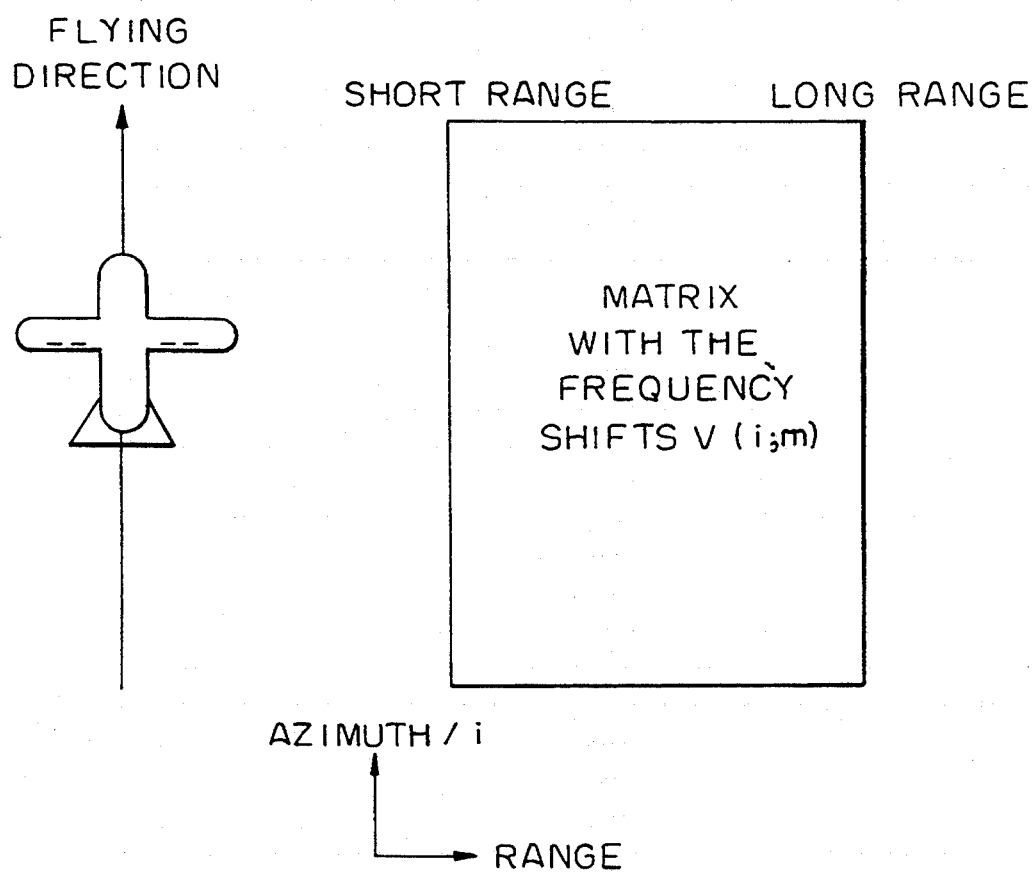
FIG. 5 is a schematic illustration of a result matrix of correlations.

The method is carried out simultaneously and independently over several strips m of $N_s$ range gates. The strips do not overlap and are uniformly distributed over the entire range area. From each strip m a frequency shift $V(i,m)$ is obtained, i denoting the time and m the number of strips. As a result, as schematically illustrated in FIG. 5, a matrix is obtained which contains all the calculated frequency shifts $V(i,m)$ with $m=0$ to $N_{RDM}$, $N_{RDM}$ denoting the number of processes or strips to be carried out simultaneously.

Then, from the matrix 900 all the values which are equal to 0 are sought. The values occupied by 0 indicate the positions where the sorting algorithm has marked an error, i.e. where all the subshift values were invalid. For each of these positions which are 0 a new value is interpolated from adjacent positions and thus an error or zero position corrected. This can be done in the following manner. If a corner point is 0, it is newly calculated from the mean value of the immediately adjacent three positions. An edge point which is equal to 0 is newly calculated from the mean value of the immediately adjacent five points whilst when the error lies in the centre the point is replaced with the mean value from the immediately adjacent eight positions.

The correspondingly corrected matrix 900 is then applied to a means 1000 in which analogously to the shift method according to DE 39 22 428 C2 the frequency shift values are processed and both the deviation in the viewing direction of the antenna and the forward velocity determined in the following manner. The separation of the forward velocity $V_y(t)$, which is contained in the first term of equation (4), and the acceleration $v_b(t)$ in the line of sight direction of a range gate ET, which is contained in the second term of equation (4), is carried out in the means illustrated as dash-line block in FIG. 1 by a high-pass filter 1001 and a low-pass filter 1003 respectively. This is possible because the forward velocity $V_y$ with wind gusts up to 1m/s has a very low bandwidth extending for example from 0 to 0.1 Hz. The acceleration $V_b$ in the antenna line of sight direction has a considerably greater bandwidth and for this reason only the higher frequency components are of significance for a motion component and thus only frequency components above 0.1 Hz are taken into account.

The data allowed to pass by the high-pass filter 1001 are subjected in two following integrating units 1004 to a double integration and thereafter standardized in a standardizing unit 1005, whilst frequency components allowed to pass by the low-pass filter 1003 need only be subjected to a standardizing in a standardizing unit 1006. At the output of the standardizing unit 1005, as motion data, the deviation $r_B$ is obtained, i.e. the deviation in the viewing direction of the antenna, whilst at the output of the standardizing unit 1006 the forward velocity v is obtained as motion data.

Figure 6:
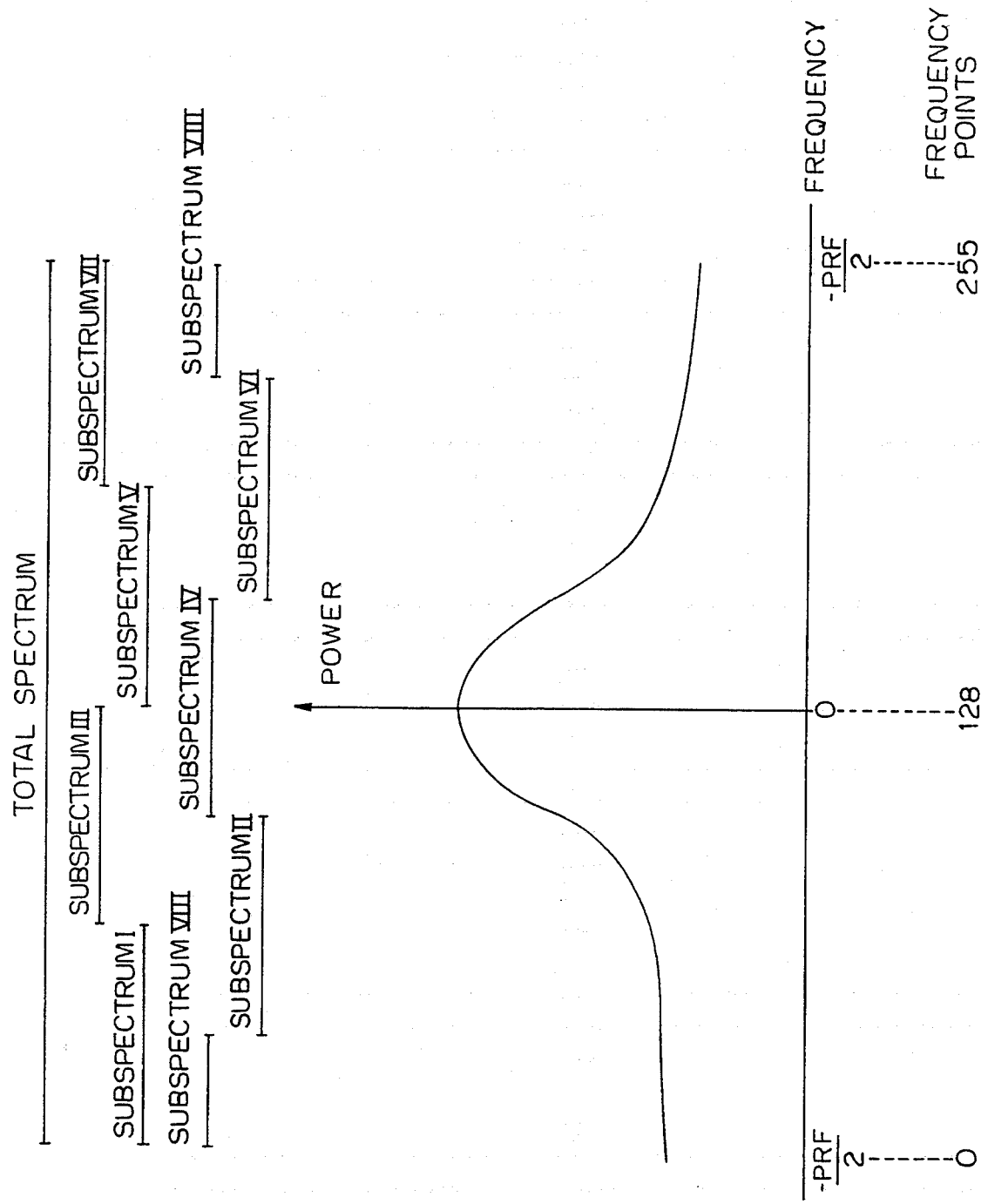
FIG. 6 shows an averaged azimuth total spectrum and the subspectra thereof.

The motion extraction method according to the invention has been employed by Applicants with great success in the experimental SAR(E-SAR) system. This system operates in the C band and thus at 5.3 GHz and at present is carried by an aircraft of the type Dornier 228. In practical trials it has been found that the best results are achieved with an averaged spectrum from a range strip of 32 range bins, corresponding to 32 spectra or 32 range gates $N_s$. The spectrum, which has a bandwidth B of 256 frequency points, i.e. B=256, is subdivided into eight subspectra (i.e. n=8), of which each subspectrum has 64 frequency points with an overlapping of 50%. With a radar pulse frequency of 1 kHz about four (4) frequency shifts per second (1000/B) can be determined. The entire spectrum is thereby subdivided into the following eight (8) subspectra, as apparent from FIG. 6, i.e. into a subspectrum I with frequency points from 0 to 63;
a subspectrum II with frequency points from 32 to 95;
a subspectrum III with frequency points from 64 to 127
a subspectrum IV with frequency points from 96 to 159
a subspectrum V with frequency points from 128 to 191
a subspectrum VI with frequency points from 160 to 223
a subspectrum VII with frequency points from 192 to 255
a subspectrum VIII with frequency points from 223 to 31

Nine (9) correlations are then carried out in each case, i.e. a correlation between the total spectra corresponding to the so-called shift method which is described in detail in DE 39 22 428 C2 and which was dealt with in its essential points at the beginning of the description. Furthermore, eight (8) correlations are carried out between the respective eight subspectra set forth above. The accuracy achieved is about three times as great as the accuracy achieved with the shift method according to DE 39 22 428 for contrast-rich terrain and about ten times as great for contrast-poor areas (such as deserts, sea and the like).

Compared not only with the inertial navigation systems mentioned at the beginning and hitherto used in many cases, but also in particular compared with the motion extraction method referred to as shift method in DE 39 22 428 C2, the method according to the invention has the advantage that it can be implemented considerably more economically than the so-called shift method because the necessary computing operations can be carried out very easily and rapidly with the computer systems and equipment available at present both in real time and off-line. Moreover, the method according to the invention can also be incorporated very effectively into the method known from DE 41 24

062 for extracting atmosphere-induced phase errors of the backscatter signal of an imaging radar system from raw data. Furthermore, the method according to the invention can also be implemented in solar or lidar systems.

We claim:

1. A method of extracting motion errors of a carrier bearing a coherent imaging radar system from radar raw data in which over a predetermined period of time consecutive azimuth spectra are continuously formed, for calculating a frequency shift over the entire azimuth spectrum ($S(f,i)$) a correlation ($K_O(f,i) = S(f,i) \otimes S(f,i-1)$ is carried out with $S(f,i)$ as azimuth spectrum at the instant i, with $S(f,i-1)$ as azimuth spectrum at the instant (i−1) and with $\otimes$ as correlation), thereafter frequency shift values are processed and the deviation in the line of sight direction of the antenna and the forward velocity are calculated, wherein after the computation of the entire azimuth spectrum ($S(f,i)$) and before the correlation ($K_O(f,i)$) the azimuth spectrum $S(f,i)$ is broken down over the entire bandwidth, consisting of B points, into n subspectra ($S_1(f,i) \ldots S_n(f,i)$), the initial frequency corresponding to $((j-1) \cdot B/n)$ of the jth subspectrum and the end frequency thereof corresponding to $(j(B/n) - 1)$ where $j = 1 \ldots n$);

the respective associated consecutive n subspectra of the two azimuth spectra are correlated with each other, i.e. $K_j(f,i) = S_j(f,i) \otimes S_j(f,i-1)$;

with the aid of an expected frequency shift ($v_{er}$) a window ($W(i) = v_{er} \pm \delta$ with $\delta$ as half-window width) is determined;

from the curve ($K_O(f,i)$) obtained by the correlation of the entire azimuth spectrum and the subcurves ($K_1(f,i) \ldots K_n(f,i)$) obtained by the subcorrelations within the window the maximum value of the curve is determined, the subshift is the position of the maximum value, the subshift is not taken into account if the maximum lies on the window boundary, and valid subshifts are subsequently sorted in ascending order and, 1. only subshifts which are not equal to zero are used,
2. a frequency shift ($v(i)$) from the mean value of up to three centrally disposed subshifts is calculated, and
3. an error marking in which a frequency shift is set to zero is transferred for the case where all the values are equal to zero or no subshift is present;

from the expected frequency shift ($v_{er}$) and the just computed frequency shift ($v(i)$) the new frequency shift ($v'_{er}$) is determined in accordance with the relationship ($v'_{er} = v_{er} \cdot C_1 + V(i) \cdot C_2$ with $C_1$ and $C_2$ as constants);

the method steps described above are carried out simultaneously and independently over several strips of range gates ($N_s$);

a frequency shift ($V(i,m)$, i denoting the time and m the range) is calculated for each strip and a matrix is formed therefrom; from said matrix all the values are sought which are equal to zero and from adjacent positions of each zero position a new value is interpolated, and the corrected matrix is further processed for processing the frequency shift values and finally the deviation in the viewing direction of the antenna and the forward velocity are calculated.

2. An apparatus for carrying out the method according to claim 1, comprising a means for calculating the azimuth spectrum ($S(f,i)$) for continuously forming consecutive azimuth spectra from radar raw data and a means for forming a correlation ($K_O(f,i)$) between respectively two azimuth spectra ($S(f,i); S(f,i-1)$) formed immediately consecutively in time, comprising a means for forming n subspectra over the entire bandwidth (B) from the spectrum calculated by said means;

registers for storing the n subspectra ($S_j(f,i)$ with $j = 1, \ldots n$);

means for correlation formation between every two immediately adjacently formed subspectra;

means for determining the position of the maximum within a window ($W(i)$);

means for sorting and marking the values obtained by the position determining means;

a means for determining a new window ($W(i+1)$);

a means for seeking and correcting the errors from the values obtained by the sorting and marking means, and a means for processing the frequency shift values and for calculating the deviation in the viewing direction of the antenna and the forward velocity.

* * * * *